(12) United States Patent  (10) Patent No.: US 7,579,954 B1
Burkley  (45) Date of Patent: Aug. 25, 2009

(54) SYSTEM AND METHOD OF SHIELDING OBJECTS UTILIZING RFID TECHNOLOGY

(76) Inventor: Robert W. Burkley, 672 N. 57th St., Omaha, NE (US) 68132

( * ) Notice: Subject to any disclaimer, the term of this patent is extended or adjusted under 35 U.S.C. 154(b) by 284 days.

(21) Appl. No.: 11/655,579

(22) Filed: Jan. 19, 2007

(51) Int. Cl.
G08B 13/14 (2006.01)
(52) U.S. Cl. ............. 340/572.3; 340/572.1; 340/572.8; 29/600; 235/441
(58) Field of Classification Search ............. 340/572.3, 340/572.1, 572.7, 572.8; 150/147; 29/600, 29/601; 235/441, 486, 385, 386
See application file for complete search history.

(56) References Cited

U.S. PATENT DOCUMENTS 6,121,544 A * 9/2000 Petsinger .................... 174/353
6,259,369 B1 * 7/2001 Monico ..................... 340/572.8
6,845,863 B1 * 1/2005 Riley ........................... 206/39
7,163,152 B2 * 1/2007 Osborn et al. .............. 235/486
7,175,084 B2 * 2/2007 Mennecart et al. .......... 235/441
7,375,631 B2 * 5/2008 Moskowitz et al. ....... 340/572.1

* cited by examiner

Primary Examiner—Davetta W Goins
(74) Attorney, Agent, or Firm—Dennis L. Thomte; Thomte Patent Law Office LLC

(57) ABSTRACT

A system is generally provided with at least one shielding body that is shaped and sized to envelop one or more objects that use RFID technology. A metal-impregnated ink is engaged with at least a portion of the one or more shielding bodies, adjacent locations where the objects will be secured. The shielding body may be formed into an envelope or envelope and carrier combination, either of which are suitable for use within mail delivery systems.

5 Claims, 4 Drawing Sheets

SYSTEM AND METHOD OF SHIELDING OBJECTS UTILIZING RFID TECHNOLOGY

BACKGROUND

Radio Frequency Identification (RFID) provides a method of automatic identification by storing and remotely retrieving data using devices known as RFID tags or transponders. Chip-based RFID tags contain silicon chips, antennas and a power source. Passive RFID tags require no internal power source. An RFID tag may be attached to or incorporated within a product, animal, or person for the purpose of identification using radio waves. However, one area that has greatly benefited from the use of RFID tags is the contactless smart card industry. Such smart cards are marketed as alternatives to magnetic strip cards, to the extent they provide convenient vehicles for storing large amounts of data unique to particular individuals. Such data may include information related to an individual's financial records, insurance coverage, individual health, and the like. Unfortunately, RFID tags, due to their contactless operation, may be powered up and have their data read without the owner's knowledge or consent.

Safety and privacy concerns related to sensitive information that may be carried on an RFID tag, coupled with an object owned by an individual, are valid. An owner or user of such an object must take care in the manner in which they store and use the object, such as a credit card, identification card, passport, or the like. However, an even greater concern arises when such an object is not yet in its intended owner's possession. For example, credit cards, passports, and various identification cards are frequently produced and then mailed via one of various mail carriers to the intended owner. While the object is within the mail delivery system, the user's sensitive information is at risk. Whether the object is being transported or simply resting within a mailbox, it would be all too easy for an unscrupulous person to gain access to the sensitive information, even where such a person could not gain physical access to the object itself.

Accordingly, what is needed is a novel system and method of shielding objects that use RFID technology. In particular, the system and method should apply to a means of safely delivering such objects from one location to another in a manner that significantly reduces the likelihood that information may be electronically read from the RFID technology utilized by the object being mailed.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The system of the present invention generally provides a shielding body, having at least first and second generally opposite surfaces. The shielding body is preferably shaped and sized to envelop an object that uses RFID technology, adjacent a predetermined area of the shielding body. An ink, comprising a metal substance, is engaged with the shielding body, adjacent the predetermined area that will hold the RFID technology laden object. In one embodiment, the shielding body is shaped to form an envelope, wherein the second surface of the shielding body substantially lines an interior compartment of the envelope.

The system of the present invention may further utilize a secondary shielding body that is shaped to form a multi-fold carrier with at least a first panel and a second panel that are selectively moveable with respect to one another between an open position and a closed position, which defines a holding chamber that is sized and shaped to substantially envelop the object containing the RFID technology. A second amount of ink may engage the secondary shielding body adjacent a predetermined holding area in which the object will be secured. Such embodiments will preferably size and shape the secondary shielding body to fit completely within the interior compartment of the envelope when the secondary shielding body is in its closed position. The ink may be disposed on one or both of the shielding bodies, depending upon the circumstances presented.

Any of the various contemplated embodiments may be utilized to secure objects containing RFID technology in a manner suitable for delivery within a mail system. Once the object is delivered, any of the contemplated embodiments may be utilized for short or long term storage within the user's possession.

It is therefore a principal object of the present invention to provide a system and method for shielding objects, which use RFID technology, that employ a shielding body that is at least partially engaged with a metal-impregnated ink and shaped in a manner that envelopes the object.

A further object of the present invention is to provide a system and method of shielding objects that use RFID technology in a manner that is suitable for safe delivery of such objects within mail delivery systems.

Still another object of the present invention is to provide a system and method for shielding objects that use RFID technology that incorporate a two-piece envelope and carrier, one or both being engaged with metal-impregnated ink.

Yet another object of the present invention is to provide a system and method for shielding objects that use RFID technology that is relatively simple and inexpensive to implement for delivering such objects from one location to another.

These and other objects of the present invention will be apparent after consideration of the Detailed Description and Figures herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
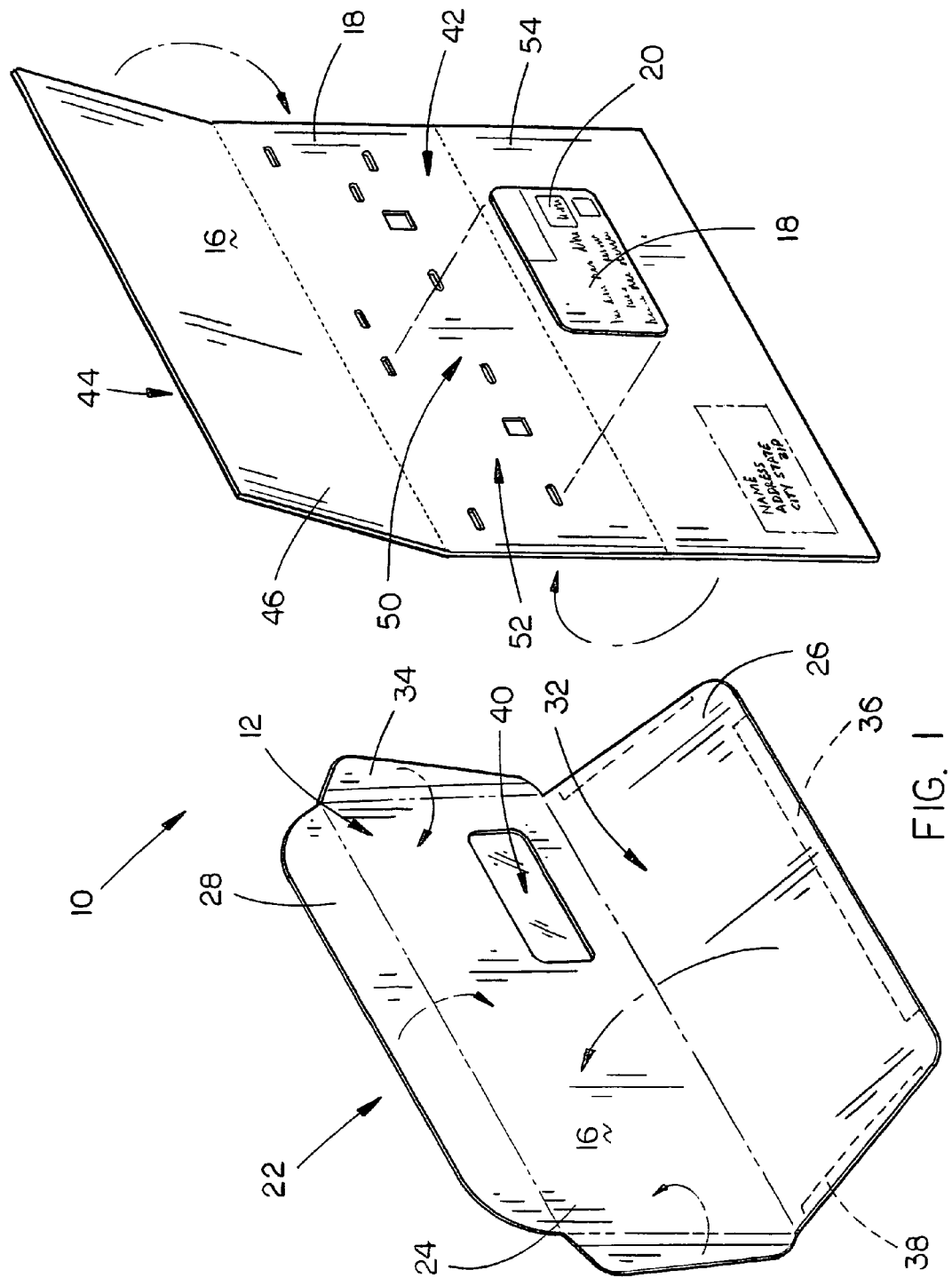
FIG. 1 depicts perspective views of an envelope and a carrier of the present invention, as they may be used to shield objects that use RFID technology.
Figure 2:
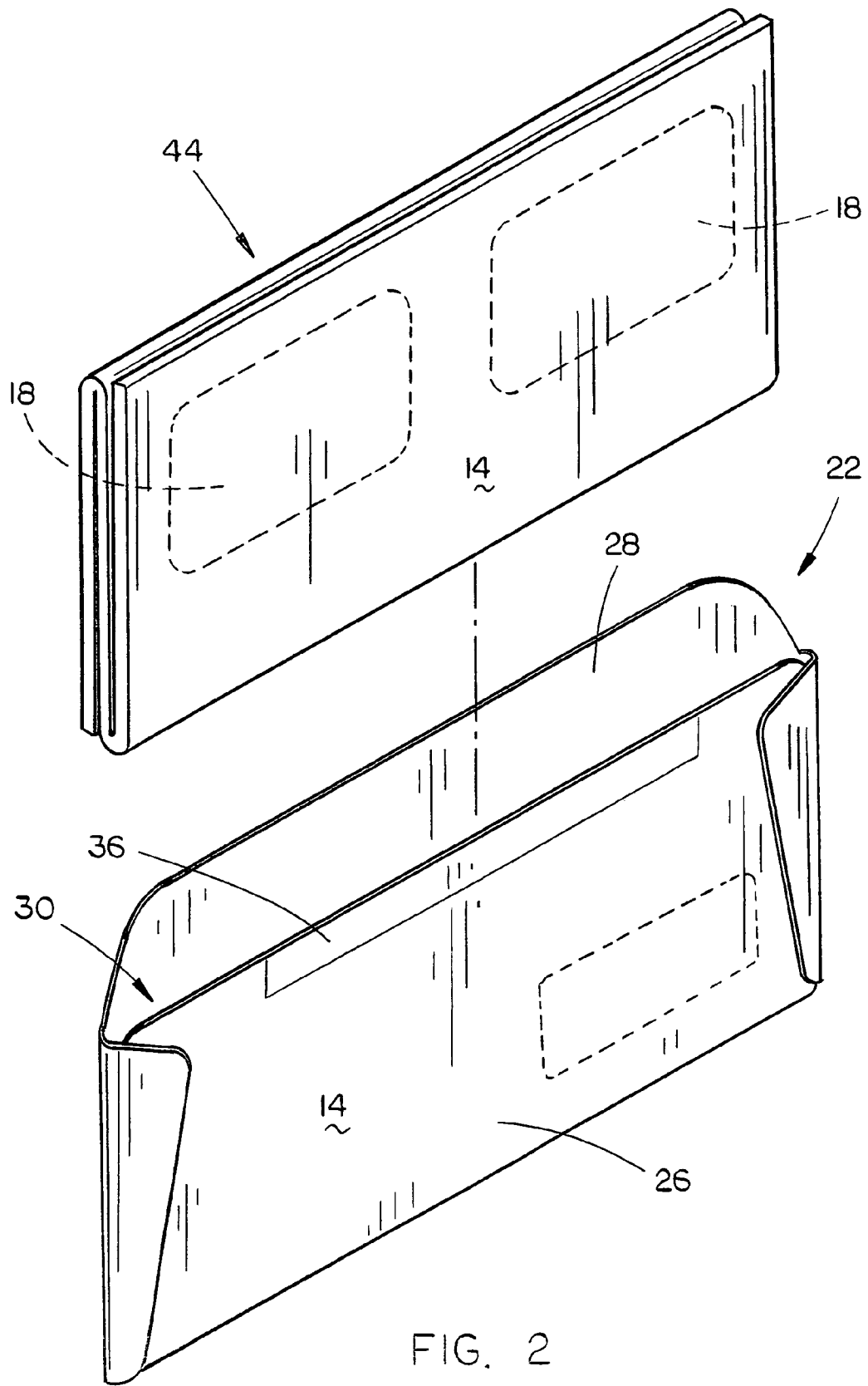
FIG. 2 depicts one manner in which the envelope and carrier of FIG. 1 may be used to shield objects that use RFID technology.
Figure 3:
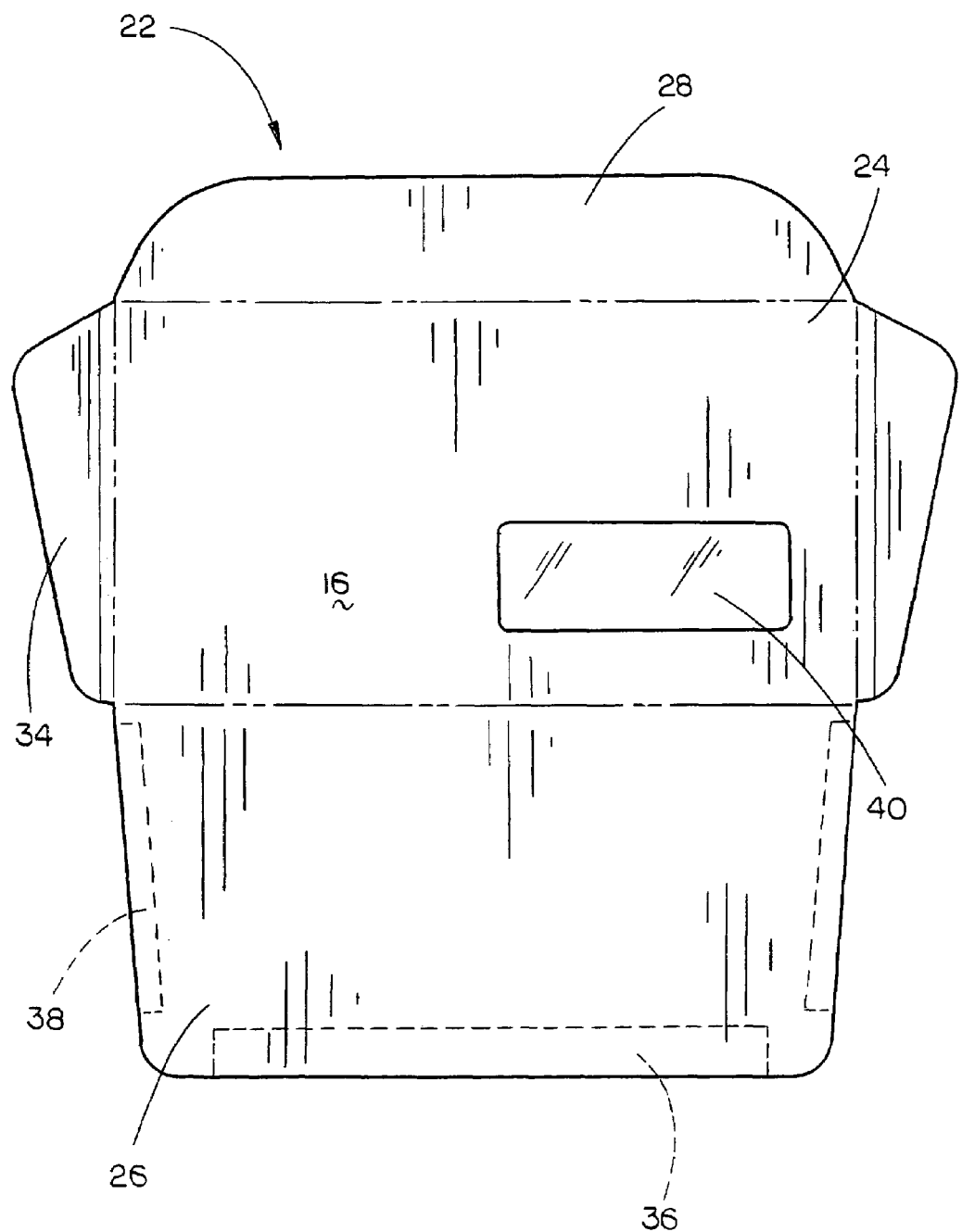
FIG. 3 depicts a top, plan view of one preferred embodiment of the envelope of the present invention.
Figure 4:
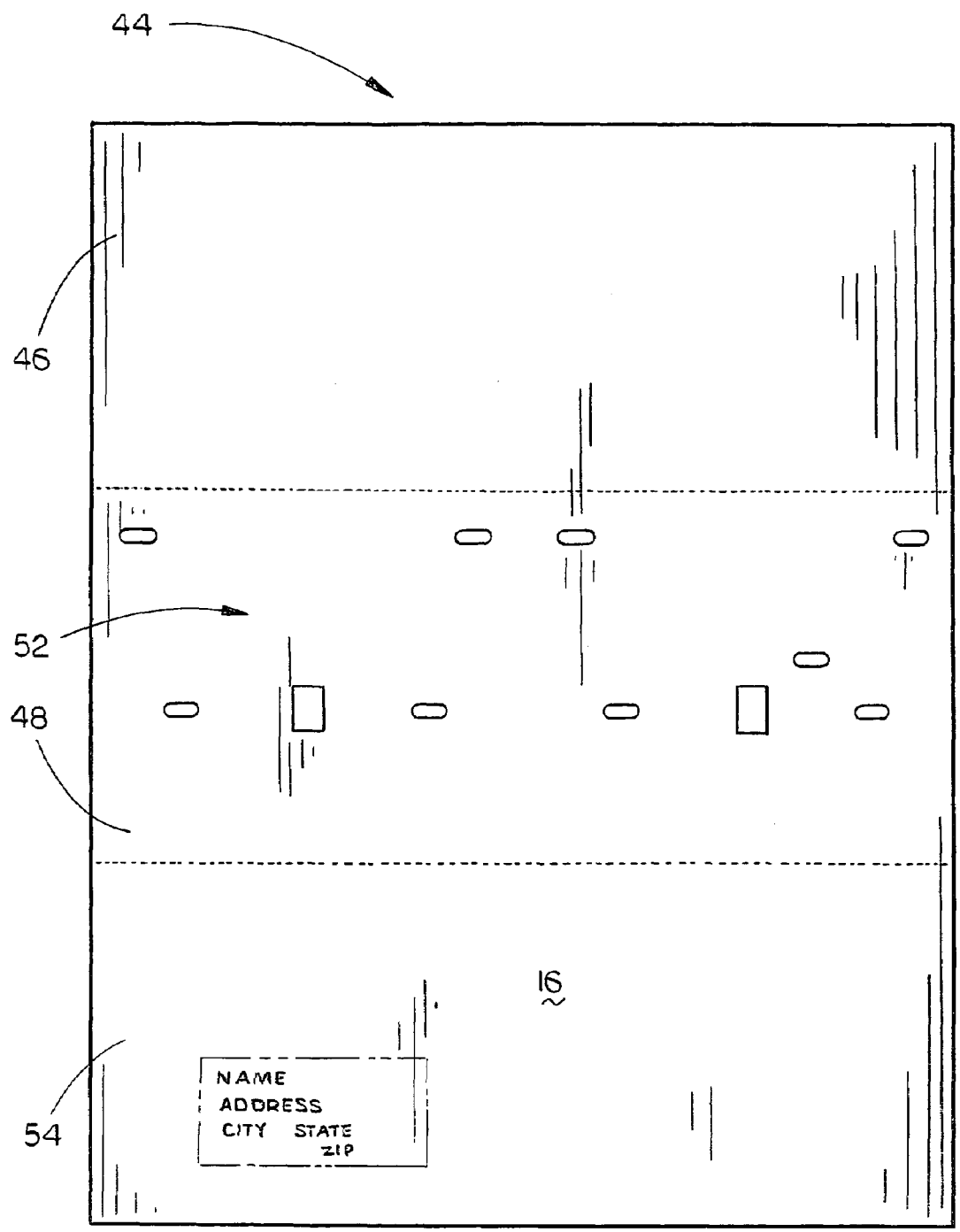
FIG. 4 depicts a top, plan view of one preferred embodiment of a carrier of the present invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The system 10 of the present invention is generally provided with a shielding body 12, having at least a first surface 14 and a generally opposite second surface 16. The shielding body 12 is preferably shaped and sized to envelop an object 18, such as a credit card, identification card, passport, or other object that uses RFID technology, such as an RFID tag 20.

An ink, comprising a metal substance, is preferably engaged with the shielding body 12 adjacent a predetermined area in which the object will be positioned. A wide variety of different inks are contemplated for use with the present invention. The type of ink selected will generally be dependant upon the inks' ability to receive the metal substance, the type of material comprising the shielding body, the method of printing to be used and the circumstances surrounding the intended use of the system 10. For example, flexographic printing processes typically utilize an ink that will adequately receive various metal substances without inhibiting the printing process. Flexographic printing is further known to use a wide range of inks and produces quality printing on a variety of different materials.

In one preferred embodiment, the shielding body 12 is shaped to form an envelope 22, having a front panel 24, rear panel 26 and a flap 28 that secures an opening 30 to an interior compartment 32. As demonstrated within FIG. 1, the envelope 22 may be constructed such that the interior compartment 32 is primarily lined with the second surface 16 of the body 12. Side flaps 34 may, in one particular example, be used to secure the front panel 24 with the rear panel 26 in order to form the side portions of the envelope 22. The metal-impregnated ink may be disposed on a substantial portion of the second surface 16 of the shielding body 12 that lines the interior compartment 32 of the envelope 22. In an alternate embodiment, the ink may be disposed on a substantial portion of the first surface 14 of the shielding body 12 that defines an exterior surface of the envelope 22. This may further provide a decorative benefit to the metal impregnated ink. In either case, it will simply be important that sufficient portions of either or both of the first surface 14 or second surface 16 be engaged with the ink, such that the metal-impregnated ink provides electromagnetic shielding to the object 18 within the envelope 22.

The metal-impregnated ink should be provided in a manner that creates a conductive enclosure to block electrostatic fields that could engage, or emanate from, the RFID tag 20 (or other such RFID technology) associated with the object 18. Sufficient conductive enclosures may be formed, wherein the ink consists of a carrier material that supports one of various suitable metals, such as copper, nickel, tin, aluminum, or similarly conductive metal, in the form of small particulate. In a preferred embodiment, the ink is disposed on, or impregnated within, the material comprising the shielding body 12. The locations in which the ink engages the shielding body 12 may depend upon the shape in which the shielding body 12 is formed but, ultimately, produces a continuous conductive layer of metal, which provides effective shielding.

It is contemplated that the form in which the shielding body 12 is crafted may require one or more "no-print zones", wherein the metal-impregnated ink is not engaged. For example, it is common in the envelope industry to utilize a remoist adhesive along a length of the envelope flap 28. Such remoist adhesives may sufficiently adhere to various metal impregnated inks on initial application. However, once remoistened, such adhesives may not adhere to surfaces engaged by the metal-impregnated inks. Accordingly, a no-print zone 36 may be designated in such instances. Likewise, depending upon the nature of the adhesive used to construct bonded portions of the structure, such as those used to secure side flaps 34 with the rear panel 26, additional no-print zones 38 may be desirable.

It is common in the envelope industry to provide an address window 40 in the front panel 24 of various types of envelopes 22. Typically, these address windows 40 are closed with one of various transparent materials. Where such an address window 40 is utilized within the envelope 22 it may be prudent to leave any material covering the address window 40 substantially free of the metal-impregnated ink. It is contemplated that the address window 40 may then create a gap in the electromagnetic shielding through which the RFID tag 20 could be accessed. Accordingly, a secondary shielding body 42 may be provided and shaped to form a multi-fold carrier 44 with at least a first panel 46 and second panel 48 that are selectively moveable with respect to one another between an open position and a closed position, which defines a holding chamber 50. The holding chamber 50 should be sized and shaped to substantially envelop the object 18, adjacent a predetermined holding area 52. A second amount of the metal-impregnated ink should be engaged with the secondary shielding body 48 adjacent the predetermined holding area 52. Specifically, the ink should be engaged with the secondary shielding body 42 in a manner that adequately provides electromagnetic shielding to supplement the loss in shielding associated with the address window 40. To that end, it is contemplated that only portions of the secondary shielding body 42 will be engaged with the metal-impregnated ink. It is also contemplated, however, that entire surfaces, such as on the first panel 46, second panel 48 or a third panel 54 may be engaged with the metal-impregnated ink. It will merely be important that the secondary shielding body 42 be shaped and sized to fit completely within the interior compartment 32 of the envelope 22 when the secondary shielding body 42 is in its closed position.

It is contemplated that the envelope 22 and the multi-fold carrier 44 may both be engaged with the metal-impregnated ink. However, it is contemplated that both such structures may be used with one another where only the envelope 22 or the multi-fold carrier 44 are engaged with metal-impregnated ink. Other circumstances may be presented that deem it prudent to use one, but not both, of the envelope 22 and the multi-fold carrier 44. It is contemplated that either or both of the envelope 22 and the multi-fold carrier 44 could be formed from paper stock, various known polymers, and the like. The use of basic paper stock and readily available inks will provide a relatively inexpensive system for providing electromagnetic shielding to objects that use RFID technology.

Regardless of the form which the shielding body 12 takes, it will be preferable that it be of sufficient construction to enable the object 18 to be delivered within a mail delivery system. This may include government-owned mail delivery systems, privately-owned mail delivery systems, inter-organization mail delivery systems, and the like. Accordingly, the system 10 is contemplated as being a single-use system for the delivery of RFID technology laden objects. However, it is contemplated that one or more components, such as the envelope 22 or the multi-fold carrier 44, may be retained for long or short term storage of such objects by their users.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. A system for shielding objects that use RFID technology, the system comprising:
    a shielding body, having at least first and second generally opposite surfaces;
    said shielding body being shaped and sized to envelop an object, which uses RFID technology, adjacent a predetermined area of said shielding body; and
    an ink, comprising a metal substance, engaged with said shielding body adjacent said predetermined area;
    said shielding body being shaped to form an envelope with a front panel, rear panel and a flap that secures an opening to an interior compartment of the envelope, which is primarily lined with the second surface of said shielding body;
    said front panel of said envelope having an address window formed therein;
    said address window being substantially free of said ink;
    a secondary shielding body, placed adjacent said shielding body, that is shaped to form a multi-fold carrier with at least a first panel and second panel that are selectively moveable with respect to one another between an open position and a closed position that defines a holding chamber, which is sized and shaped to substantially envelope an object, which uses RFID technology, adjacent a predetermined holding area of said secondary shielding body; and
    a second amount of said ink engaged with said secondary shielding body adjacent said predetermined holding area.

2. The system of claim 1 wherein said secondary shielding body is shaped and sized to fit completely within the interior compartment of said envelope when said secondary shielding body is in said closed position; said second amount of said ink further being engaged with said secondary shielding body at a location that substantially covers an area on the second surface of the envelope, defined by said address window in the envelope, when said secondary shielding body is disposed within the envelope.

3. The system of claim 2 wherein said shielding body and said secondary shielding body are comprised of paper stock.

4. The system of claim 1 wherein said holding area is primarily lined with the second surface of said shielding body and said ink is disposed on a substantial portion of the second surface of said shielding body that lines the holding area of the carrier.

5. A method of using the system as claimed in claim 1, the method comprising the steps of:
    placing an object, which uses RFID technology, within the interior compartment of said envelope; and
    placing said envelope in a mail delivery system for delivery of said envelope from one location to another.

* * * * *